United States Patent [19]
Raymer

[11] Patent Number: 5,697,754
[45] Date of Patent: Dec. 16, 1997

[54] AUTOMATIC RAMP CAR WITH HYDRAULICALLY POWERED ELEMENTS

[75] Inventor: W. Eddie Raymer, Louisville, Ky.

[73] Assignee: Lincoln Industries Corp, Louisville, Ky.

[21] Appl. No.: 603,392

[22] Filed: Feb. 20, 1996

[51] Int. Cl.[6] ........................................ B60P 1/43
[52] U.S. Cl. ..................... 414/537; 414/786; 414/339; 14/2.4; 14/71.3; 901/25
[58] Field of Search ........................ 414/537, 538, 414/339, 786, 522, 569, 680; 244/137.1; 14/71.1, 69.5, 71.3, 71.5, 71.7, 72.5, 2.4; 254/93 R, 93 VA; 104/2, 137; 195/447, 448; 901/19, 22, 25

[56] References Cited

U.S. PATENT DOCUMENTS

| | | | |
|---|---|---|---|
| 3,610,058 | 10/1971 | Mueller et al. | 901/25 X |
| 3,790,001 | 2/1974 | Schnell | 414/917 X |
| 4,068,770 | 1/1978 | Boehringer | 414/537 |
| 4,510,637 | 4/1985 | Zlotnicki | 14/2.4 |
| 4,911,033 | 3/1990 | Rosheim et al. | 901/25 X |
| 4,972,539 | 11/1990 | Reiter | 14/2.4 |
| 5,312,148 | 5/1994 | Morgan | 414/537 X |
| 5,443,353 | 8/1995 | Raymer | |

FOREIGN PATENT DOCUMENTS

| | | | |
|---|---|---|---|
| 215487 | 9/1988 | Japan | 414/537 |
| 1258761 | 9/1986 | U.S.S.R. | 414/537 |

*Primary Examiner*—Frank E. Werner
*Attorney, Agent, or Firm*—Nixon & Vanderhye P.C.

[57] ABSTRACT

A deployable and retractable ramp assembly includes at least three Z-foldable ramp sections which are pivotally connected to each other and to a railroad car. A number of mechanical deployment and retraction facilitating elements—preferably gears—are mounted to the ramp sections and operatively connected to a plurality of actuators—preferably linear actuators such as hydraulic cylinders—mounted on and completely contained within ramp sections. Using a linear actuator on the railroad car the ramp sections, once folded, can be pivoted into a position substantially completely supported by the railroad car. The ramp sections (typically six in number and pivotally connected to a lever on the railroad car) may be automatically and positively deployed in less than twenty minutes, and once deployed allow railroad equipment to be moved to and from the railroad tracks.

20 Claims, 5 Drawing Sheets

AUTOMATIC RAMP CAR WITH HYDRAULICALLY POWERED ELEMENTS

BACKGROUND AND SUMMARY OF THE INVENTION

In U.S. Pat. No. 5,443,353 (the disclosure of which is hereby incorporated by reference herein) an automatic ramp car is provided which utilizes a readily deployable and retractable ramp assembly which reliably and relatively simply allows vehicles and objects to be moved up or down a ramp assembly to or from a larger vehicle or loading dock. The automatic ramp car illustrated therein is particularly suitable for use in association with a railroad car, being sturdy enough—despite its simplicity of construction and the readily deployable and retractable nature thereof—to allow a very heavy object to be moved up and down the ramp when deployed, and when retracted to provide a relatively low volume configuration taking up a minimum amount of surface area. The automatic ramp car illustrated therein is usable to facilitate loading and unloading of large pieces of railroad equipment such as railroad maintenance of way equipment.

While the automatic ramp car of U.S. Pat. No. 5,443,353 is highly advantageous and a significant advance in the art, because it utilizes cables and masts to effect the deployment and retraction of the ramp sections, it is slightly more complicated and slightly less reliable than optimum. Also, operation requires connection and disconnection of various components at different stages, meaning that for large ramp assemblies, which are most desirably used on railroad cars, the time it takes for effective deployment or retraction can be more than twenty minutes.

According to the present invention a deployable and retractable ramp assembly, typically mounted on a railroad car, and a method of deploying a ramp section of the ramp assembly, am provided which have all of the advantages of the automatic ramp car described in U.S. Pat. No. 5,443,353, but also optimize various features thereof. For example, according to the invention retraction and deployment may be done more quickly (less than twenty minutes, typically between about 10–15 minutes) without requiring significant operator intervention during deployment and retraction. Also, reliability is increased by doing away with the cable and masts associated with the prior automatic ramp car, and instead utilizing actuators and mechanical elements that are primarily completely associated with the ramp sections themselves. In a preferred embodiment according to the present invention it is possible to effect deployment and retraction of the ramp sections in an efficient manner utilizing a hydraulic system powered by a gasoline or diesel engine, and utilizing a programmable controller.

According to one aspect of the present invention a deployable and retractable ramp assembly is provided which comprises the following components: At least three Z-foldable ramp sections comprising first, second and third sections each having first and second ends, the second end of the first ramp section pivotally connected to the first end of the second ramp section, and the third ramp section first end pivotally connected to the second ramp section second end. First through fourth gears, the first gear mounted on the first ramp section second end and cooperating with the second gear mounted on the second ramp section first end, and the third gear mounted on the second ramp section second end and cooperating with the fourth gear mounted on the third ramp section first end. And first and second actuators each mounted on one of the ramp sections and each connected to one of the gears for rotating the gear to effect pivotal action of the first ramp section with respect to the second ramp section, and the second ramp section with respect to the third ramp section.

As earlier indicated, the actuators are preferably linear actuators, and preferably hydraulic cylinders associated with the hydraulic system powered by the gasoline or diesel engine which is readily transported with the railroad car. In one embodiment the first and second linear actuators are both mounted on a second ramp section, and the first linear actuator is connected to the second gear and the second linear actuator to the third gear. Each of the second and third gears has a gear ratio of at least 2:1 with respect to the first and fourth gears, preferably a gear ratio of about 4:1. For situations in which other ramp sections and gears and linear actuators are utilized, typically the linear actuators are connected to larger gears than the gears that they mesh with so as to provide a gear ratio of at least about 2:1.

Preferably the at least three ramp sections comprises at least four Z-folded amp sections, including a fourth ramp section having first and second ends, the fourth ramp section pivotally connected at the first end thereof to the second end of the third ramp section. The assembly further comprises fifth and sixth gears, the fifth gear mounted on the third ramp section second end and cooperating with the sixth gear, which is mounted on the fourth ramp section first end; and a third linear actuator connected to one of the fifth and sixth gears and mounted on one of the third and fourth ramp sections. The assembly also typically further comprises a railroad car, and the fourth ramp section second end is typically operatively pivotally connected to the railroad car for deployment or retraction with respect to the railroad car. The assembly also preferably comprises a pair of rail engaging wheels mounted to the first ramp section first end for engaging a train track rail and facilitating movement of the ramp sections with respect to a train track rail during deployment or retraction as the linear actuators are extended or withdrawn, respectively.

The at least four ramp sections typically comprise six substantially equal size (length and width) Z-folded ramp sections including fifth and sixth ramp sections having first and second ends, respectively, the fifth and sixth ramp sections operatively pivotally connecting the fourth ramp section to the railroad car. Preferably the fifth ramp section first end is pivotally connected to the fourth ramp section second end, and the fifth ramp section second end is pivotally connected to the sixth ramp section first end, and the sixth ramp section second end is pivotally connected to the railroad car. The assembly further comprises seventh, eighth, ninth, tenth, eleventh, and twelfth gears, the seventh gear connected to the fourth ramp section second end and cooperating with the eighth gear which is connected to the fifth ramp section first end, and the ninth gear connected to the fifth ramp section second end and cooperating with the tenth gear which is connected to the sixth ramp section first end, and the eleventh gear connected to the sixth ramp section second end and cooperating with the twelfth gear which is connected to the railroad car. The assembly also comprises fourth, fifth and sixth linear actuators, the fourth actuator mounted to one of the fourth and fifth ramp sections and connected to one of the seventh or eight gears, and the fifth actuator mounted to one of the fifth and sixth ramp sections and connected to one of the ninth and tenth gears, and the sixth actuator mounted to one of the sixth ramp section and the railroad car and connected to one of the eleventh or twelfth gears. The fourth, fifth and sixth linear actuators cooperate with the first, second and third actuators to deploy or retract the ramp sections with respect to the railroad car.

The railroad car typically includes a lever having first and second ends thereof, the lever first end comprising a portion of the railroad car pivotally connected, at the first end thereof, to the sixth ramp section and containing the twelfth gear, and the lever pivotally connected at the second end thereof to a non-pivotal portion of the railroad car. The assembly further comprises a seventh linear actuator mounted to the railroad car and for moving the lever about the pivotal connection to the non-pivotal portion of the railroad car to move the ramp sections, when retracted, from a first position in which parts of the ramp sections extend horizontally outwardly from the railroad car, to a transporting position in which the ramp sections are all disposed substantially completely on the railroad car, and do not extend horizontally outwardly therefrom.

Usually supporting legs are provided for supporting the ramp sections when deployed from the railroad car. The legs may be automatically deployed, such as shown in U.S. Pat. No. 5,443,353. Also, the ramp sections preferably have the same basic construction as in the U.S. Pat. No. 5,443,353 patent; that is they may each comprise first and second six by twelve inch rectangular tubes, or railroad rails, spaced from each other by cross braces the same distance as the space in the railroad car wheels on a common axle.

According to another aspect of the present invention a deployable and retractable assembly mounted on a railroad car is provided comprising the following components: A railroad car having a substantially horizontal support surface. At least three Z-foldable ramp sections comprising first, second and third sections each having first and second ends, the second end of the first ramp section pivotally connected to the first end of the second ramp section, and the third section first end pivotally connected to the second section second end and the third section second end operatively pivotally connected to the railroad car. A plurality of actuators each mounted on and completely contained by one of the ramp sections. And a plurality of mechanical deployment and retraction facilitating elements mounted to the ramp sections and operatively connected to the actuators for cooperating with the actuators to effect pivotal action of the first ramp section with respect to the second ramp section, and the second ramp section with respect to the third ramp section, during deployment and retraction of the ramp sections with respect to the railroad car.

The mechanical deployment and reaction facilitating elements may comprise a wide variety of components, such as levers, cams, shafts, chains and sprockets, pulleys and belts, or the like. However, in the preferred embodiment according to the invention the mechanical deployment and reaction facilitating elements comprise intermeshing gears. Also, the actuators may comprise rotary or other type actuators, but in the preferred embodiment are linear actuators such as the hydraulic cylinders as described above.

The at least three Z-foldable ramp sections preferably comprise six substantially equal size Z-folded ramp sections including fourth, fifth and sixth ramp sections which operatively pivotally connect the third section to the railroad car, and are pivotally connected to each other. Also, the assembly preferably further comprises means mounted on the railroad car for moving the ramp sections when retracted from a first position in which parts of the ramp sections extend horizontally outwardly from the railroad car to a transporting position in which the ramp sections do not significantly extend horizontally outwardly from the railroad car, but are substantially completely supported in a retracted position on the substantially horizontal support surface.

The invention also relates to a method of deploying a plurality of Z-folded ramp sections from a folded retracted position mounted on a substantially horizontal support surface of a railroad car, to a deployed position in which the ramp sections extend from the railroad car to a train track rail, allowing equipment to be moved on and off the railroad car along the ramp sections, the method comprising the steps of sequentially: (a) Automatically, using an actuator on the railroad car, moving the ramp sections from a first folded retracted position in which none of the ramp sections horizontally overlap the railroad car substantially horizontal support surface to a second folded retracted position in which the ramp sections horizontally overlap the railroad car substantially horizontal support surface. (b) Automatically moving the ramp sections from the second folded retracted position to a third folded retracted position in which the ramp sections are substantially completely horizontally exterior of the railroad car. (c) Automatically, using actuators substantially completely mounted on and contained by the ramp sections, causing one of the ramp sections to pivot with respect to the other ramp sections until a portion thereof engages the train track rail on which the railroad car is positioned, so that the rail-engaging portion partially supports the ramp sections. And (d) automatically, using actuators substantially completely mounted on and contained by the ramp sections, causing the ramp sections to pivot with respect to each other and the railroad car to move to the deployed position in which the ramp sections allow equipment to be moved on and off the railroad car therealong to and from train track mails. Steps (a)–(d) am practiced in less than twenty minutes (preferably about 10–15 minutes), and can be practiced in substantially reverse order to retract the ramp sections.

It is the primary object of the present invention to provide a deployable and retractable ramp assembly, and method of deploying and retraction thereof, which retain all of the advantages of the assembly and method of U.S. Pat. No. 5,443,353 but are even simpler and more reliable, and can effect deployment and retraction in even a shorter period of time. This and other objects of the invention will become clear from an inspection of the detailed description of the invention and from the appended claims.

BRIEF DESCRIPTION OF THE DRAWINGS

FIG. 1A is a left side view of FIG. 1 while

FIG. 2A is a left side view of FIG. 2 while

DETAILED DESCRIPTION OF THE DRAWINGS

A deployable and retractable ramp assembly according to the present invention is shown generally by reference numeral 10 in the drawings. The assembly 10 is shown in association with a conventional (e.g. flat bed) railroad car 11, however it is to be understood that the ramp assembly according to the present invention may be used with loading docks, other vehicles, or the like and is not restricted to use with a railroad car 11. However, the advantages of the assembly according to the present invention are best realized in association with a railroad car, a ramp assembly 10 according to the present invention having such a sturdy construction that it is capable of loading or unloading equipment having the weight up to about 60 tons onto a conventional railroad car 11.

The conventional railroad car 11, a portion of which is illustrated in the drawings, includes a substantially horizontal support surface (deck) 12 for equipment, and for the assembly 10 when in a completely folded and retracted position. It also includes a conventional coupling 13, and conventional wheel trains 14 which are adapted to move along a conventional train track rail 15.

In its simplest form, the ramp assembly 10 according to the present invention comprises three Z-foldable ramp sections including a first section 17 (see FIGS. 1A, 2A, 3 and 4 in particular), a second section 18, and a third section 19, each having first and second ends. The ramp sections 17-19 are preferably constructed and pivotally connected to each other basically as described in U.S. Pat. No. 5,443,353, for example, comprising six by twelve inch rectangular tubes (e.g. separated apart by cross braces such as cross braces 25 illustrated in FIG. 1A) or the like. Since the details of exactly how the sections are pivotally connected to each are not particularly significant—it is only necessary that there be a pivotal connection—these details are not shown in the drawings. As can be seen by the partially deployed configuration of FIG. 3, the second end of the first section 17 is pivotally connected to a first end of the second section 18, while the second end of the second section 18 is pivotally connected to the first end of the third section 19, in a Z-fold manner. The second end of the third section 19 is operatively connected to the railroad car 11 either directly by a pivotal connection, or—as seen in the drawings—by other ramp sections. The preferred embodiment illustrated includes six ramp sections as well as a lever mounted on the railroad car 11, the fourth ramp section being illustrated by reference numeral 20, the fifth by reference numeral 21, the sixth by reference numeral 22, and the lever by reference numeral 23.

Figure 1:
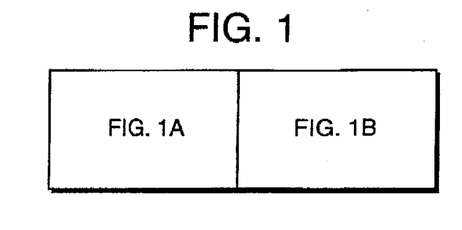
FIG. 1 is a bottom schematic plan view of a deployed ramp assembly and a railroad car according to the present invention.
Figure 2:
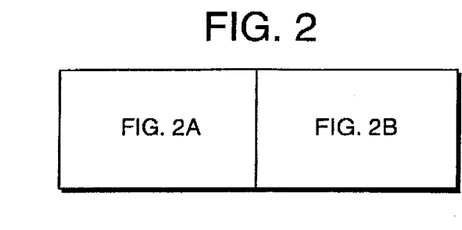
FIG. 2 is a side schematic view of the ramp assembly and railroad car illustrated in FIG. 1.
Figure 2B:
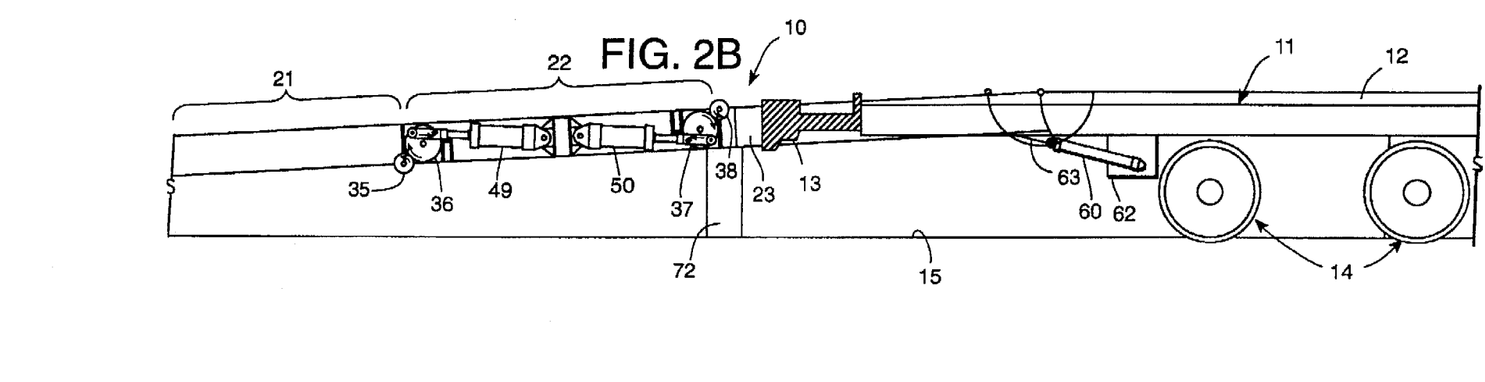
FIG. 2B is a right side view of FIG. 2.
Figure 3:
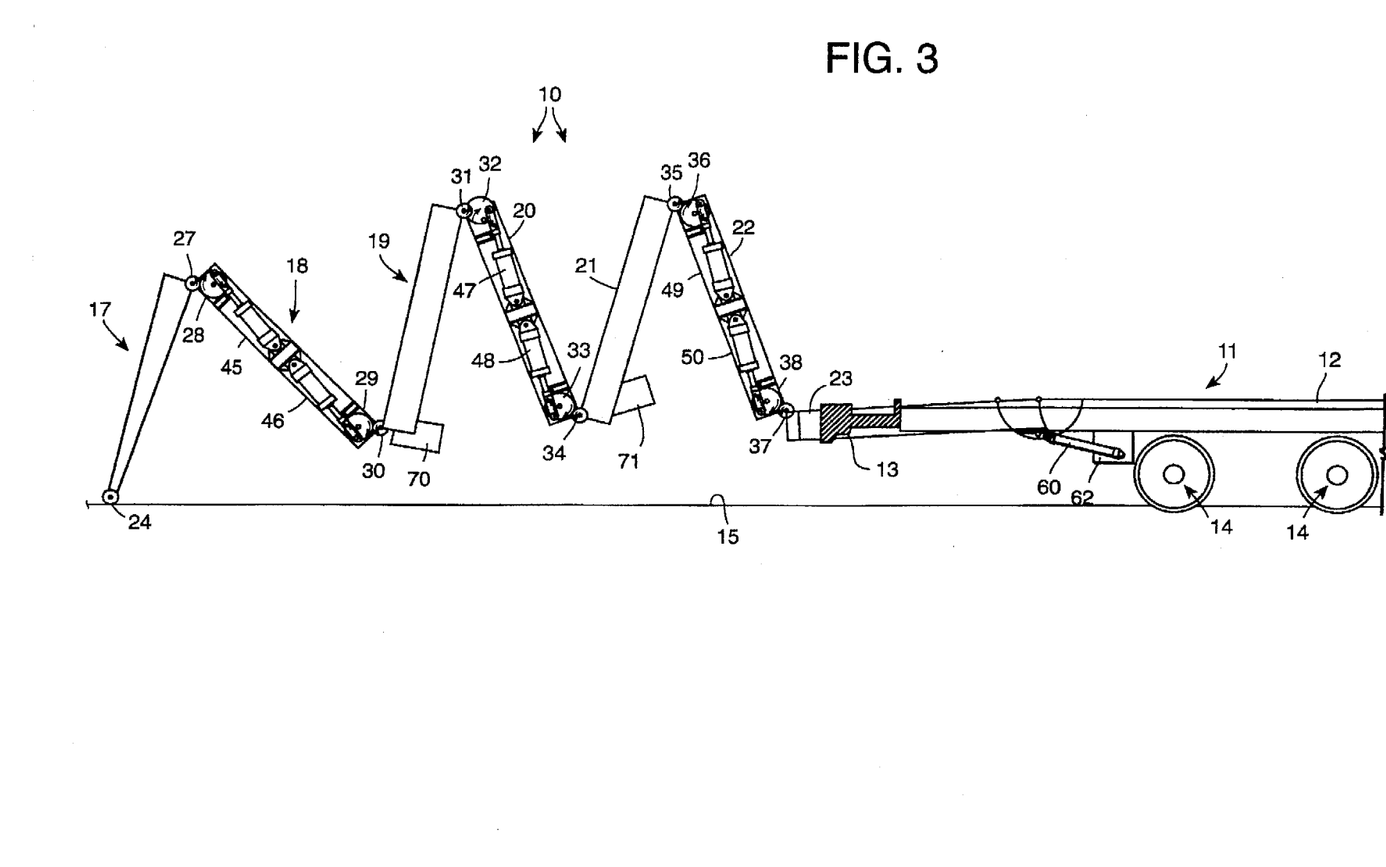
FIG. 3 is a side schematic view illustrating the components of FIGS. 1 and 2 at an early stage of retraction or late stage of deployment.
Figure 4:
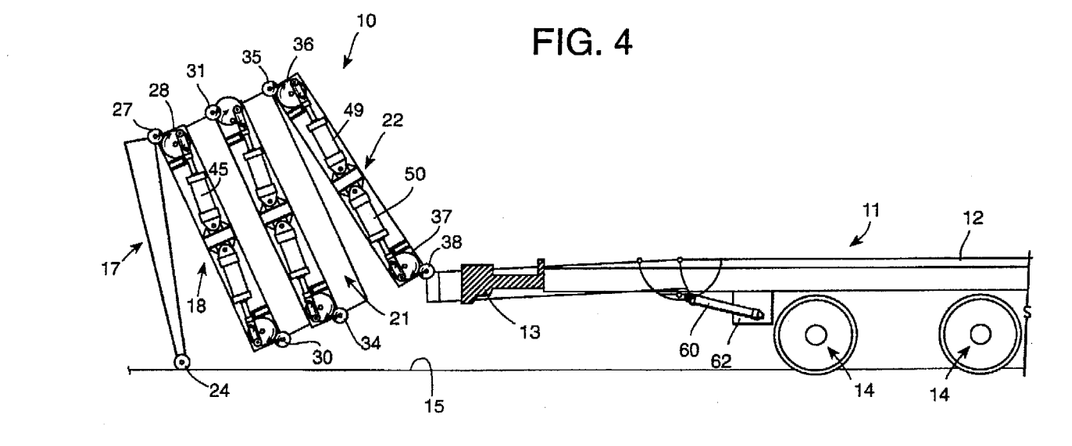
FIG. 4 is a view like that of FIG. 3 showing the components in a late stage of retraction and an early stage of deployment.

Preferably—as seen in FIGS. 3 and 4—the first section 17 first end preferably includes removable train track rail 15 engaging wheels 24 (typically a pair of such wheels 24). These wheels 24 are typically placed in connection with the first end of the first ramp section 17 when the ramp sections 10 are in the position illustrated in FIG. 5, so that the wheels 24 engage the track rail 15 during deployment or retraction (see FIGS. 3 and 4), but then removed again when the ramp sections 10 are completely deployed (as seen in FIGS. 1 and 2).

According to the invention the ramp sections 17 through 22 are deployable and retractable without the necessity for using masts or cables as in U.S. Pat. No. 5,443,353, but rather can be deployed and retracted by using actuators and mechanical deployment and retraction facilitating elements that are mounted on and completely contained by one or more of the ramp sections 17 through 19. The mechanical deployment and retraction facilitating elements may comprise levers, cams, shafts, sprockets and chains, and pulleys and belts. However, primarily for the purposes of simplicity and reliability, especially when the ramp assembly 10 is utilized with a railroad car 11 and may support equipment weighing as much as 60 tons, so that a robust construction of all the components is required, it is preferred that the mechanical deployment and retraction facilitating elements comprise gears. In the embodiment illustrated in the drawings, a first such gear is illustrated by reference numeral 27 and cooperates with (typically intermeshes with) a second gear 28, while a third gear 29 cooperates with the fourth gear 30, a fifth gear 31 cooperates with a sixth gear 32, a seventh gear 33 cooperates with an eighth gear 34, a ninth gear 35 cooperates with a tenth gear 36, and an eleventh gear 37 cooperates with a twelfth gear 38. Note that in all of the side views (FIGS. 2 through 7) the actuators and gears are illustrated as visible for clarity of illustration. However, typically, except for the smaller gears 27, 30, 31, 34, 35, 38, they would not be visible because they would be obscured by the side rectangular tube (or rail) of their associated frame sections 17 through 22.

The gears 27 through 38 are preferably spur gears, but may be of any other conventional construction, such as worm gears, bevel gears, helical gears, or the like. In the embodiment illustrated in the drawings—in particular see FIGS. 1 and 2—the gears 27, 30, 31, 34, 35, and 38 are spur gears mounted shafts 40, the ends of which are received in anchor housings 41. Since the shafts 40 are part of the typical pivotal connection between the associated adjacent ramp sections (the first and second sections 17, 18 in FIG. 1A) rotation of the gear 27 effects rotation of the shaft 40, and thus relative pivotal movement between the sections 17, 18 occurs as the gear 27 is rotated by the gear 28. The gears 28, 29, 32, 33, 36, 37 on the other hand are mounted by shaft stubs 42 (see FIG. 1A) received by bearings in plates 43 rigidly connected to a ramp section 17 through 22 (e.g. a cross brace 25).

Figures 1A, 2A:
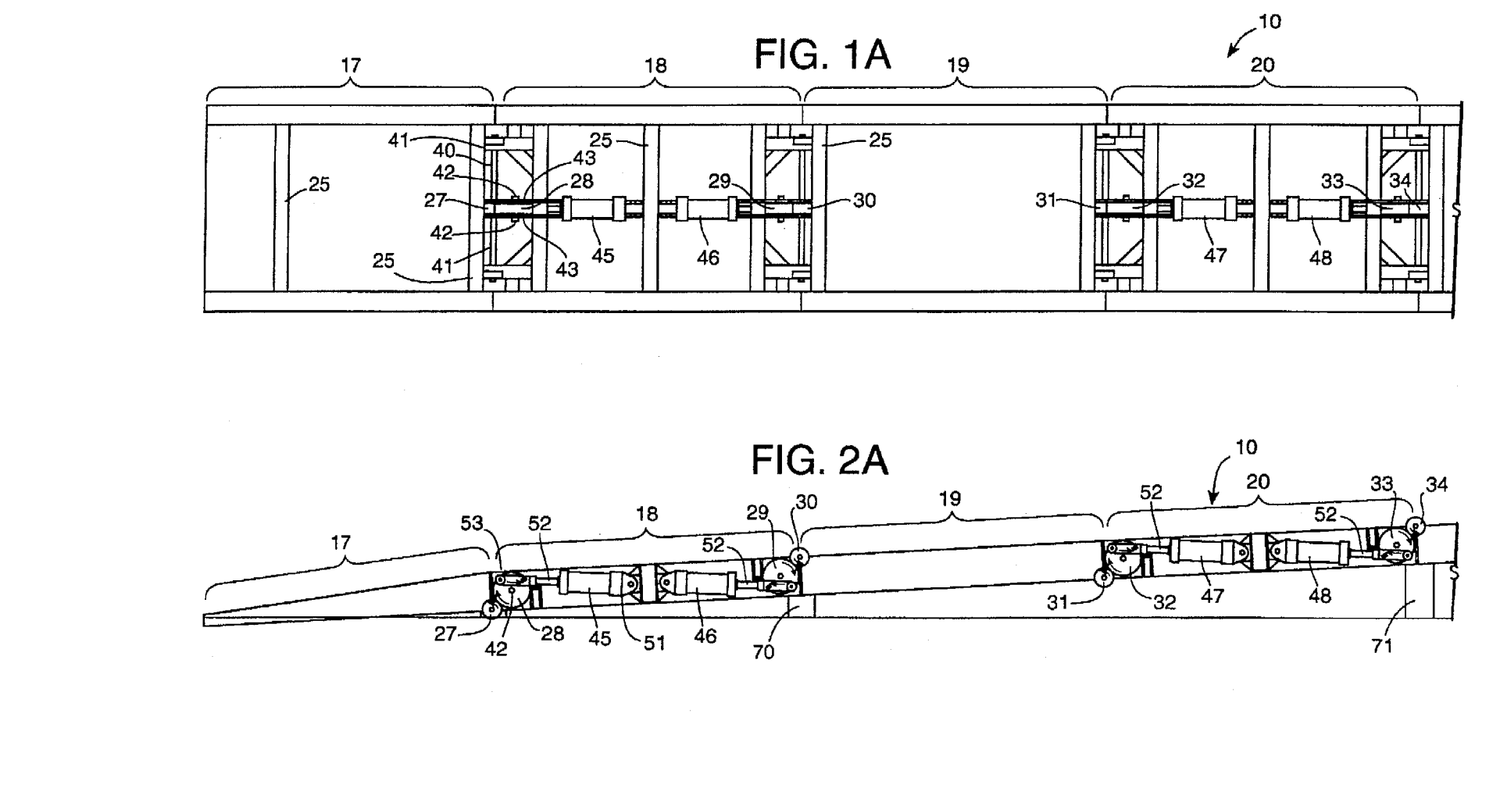

Some of the gears 27-38 are connected to actuators which are mounted on (and typically contained completely by) one of the ramp sections 17 through 22. While the actuators may be rotary actuators, such as motors, or oscillating or other conventional actuators having different types of movement, preferably the actuators are linear actuators. While the linear actuators may comprise electrically, pneumatically, or other conventional types of powered linear actuators (e.g. powered shafts with traveling nuts, movable racks, etc.), in a preferred embodiment they are hydraulic cylinders. In the drawings the linear actuators (illustrated hydraulic cylinders) comprise a first actuator 45, a second actuator 46, a third actuator 47, a fourth actuator 48, a fifth actuator 49, and a sixth actuator 50. Each of the actuators 45 through 50 (illustrated only with respect to the first actuator 45 as seen in FIGS. 1A and 2A) are pivotally connected at a first end 51 thereof to one of the ramp sections 17 through 22 (i.e. the ramp section 18 for the actuator 45) such as a cross brace 25 thereof, and pivotally connected by a crank arm (comprising a piston rod 52 and the pivotal crank connection 53 as seen in FIG. 2A) off center of the pivot axis (e.g. 42) of the gear to which it is connected (28 in FIGS. 1A and 2A for the actuator 45). Therefore, by supplying hydraulic fluid to the actuator 45 the piston rod/crank arm 52 will be extended or retracted, and as a result of that will rotate the gear—the gear 28 in FIGS. 1A and 2A—to which it is connected.

In the preferred embodiment the gears to which the actuators 45-50 are connected (that is in the preferred embodiment the gears 28, 29, 32, 33, 36, 37 to which the actuators 45-50, respectively, are connected) are larger than the gears that they intermesh with, so that a gear ratio is provided which allows only a relatively small rotation of the gears 28, 29, for example, to be transformed into a relatively large rotation of the gears 27, 30 that they intermesh with. Since between the fully retracted and fully deployed positions of the Z-folded ramp sections 17 through 22 the ramp sections will pivot 180°, a gear ratio of at least about 2:1 is preferred, and preferably a gear ratio of about 4:1. With a gear ratio of 4:1, for example, the linear actuator 45 through the piston rod/crank arm 52, 53 need only rotate the gear 28 forty-five degrees to effect a 180° rotation of the gear 27, and thus a 180° pivotal movement of the first ramp section 17 (e.g. from the position of FIG. 2A to the position of FIG. 5) with respect to the second ramp section 18.

While the invention has been described above with respect to a single gear and actuator associated with each of the ramp section ends, it is to be understood that multiple gears may be provided instead of single gears, planetary gear trains, or even multiple actuators that are synchronized to operate together. Thus, for example, the term "first gear 27" is to be interpreted to cover one or more gears associated with the second end of the first ramp section 17, and the term "first actuator 45" is to be interpreted to cover one more actuators for rotating one or more gears 28.

Figure 8:
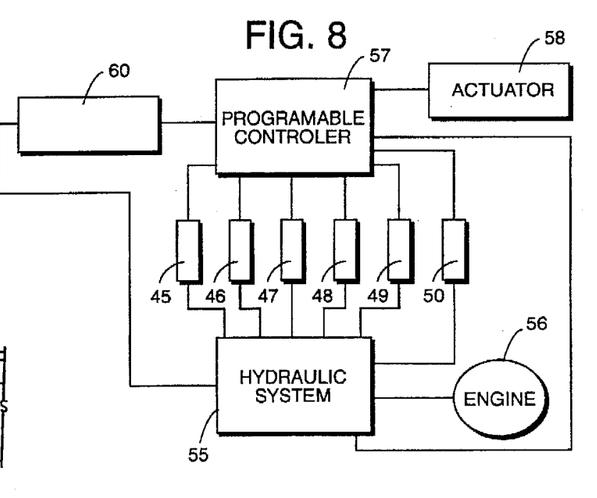
FIG. 8 is a control schematic for the assembly of FIGS. 1 through 7.

As seen schematically in FIG. 8, the linear actuators 45-50 are preferably operatively connected to a common hydraulic system shown schematically at 55 and driven by an engine 56, which typically may comprise a diesel or gasoline engine. The hydraulic system 55 (including all associated reservoirs, valves, conduits and the like) and the engine 56 are readily mountable on the railroad car 11, or with some components (such as conduits and valves) on the ramp assembly 10. Preferably a conventional programmable controller—illustrated schematically at 57 in FIG. 8—is provided for controlling the hydraulic system 55 and the extension or retraction (in a particular sequence and timing thereof) of each of the cylinders 45-50. The controller 57 itself is responsive to actuation by a manual actuator 58 or the like, controlled by an operator.

Figure 5:
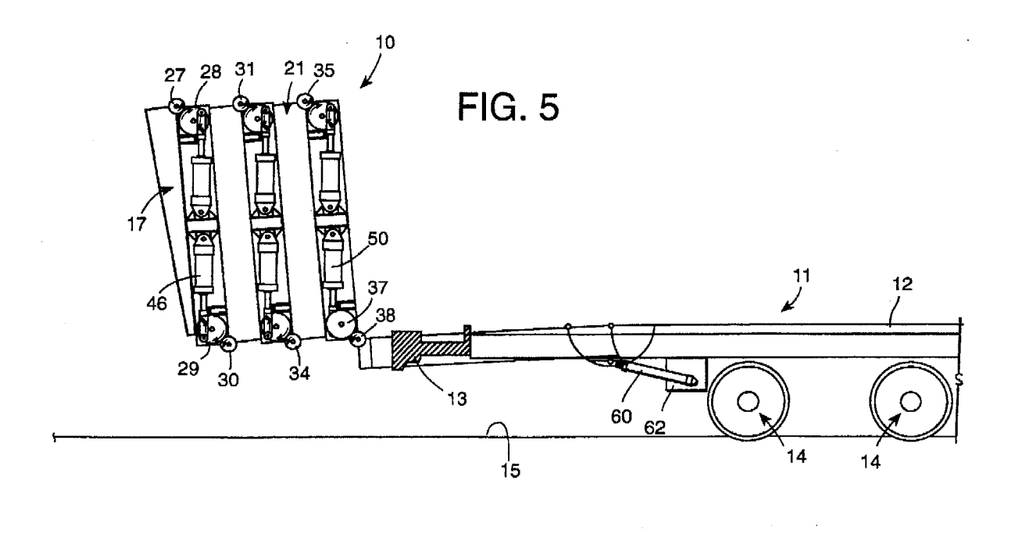
FIG. 5 is a view like that of FIG. 4 only showing the ramp sections when completely folded but in a position ready to be deployed, or during retraction ready to be positioned on the railroad car.

The components hereto described are capable of moving the ramp sections 17 through 22 from a fully folded up position, as illustrated in FIG. 5, to a fully deployed position, as illustrated in FIGS. 1 and 2, through the intermediate positions (and any others) of FIGS. 3 and 4. According to the preferred embodiment of the invention it is also desirable to be able to move the ramp assembly 10 from the fully folded up position illustrated in FIG. 5 to a transporting position where it is substantially completely supported by the deck 12. This is preferably accomplished by utilizing the lever 23 and one or more (a seventh) linear actuators 60 mounted to the railroad car 11.

Figure 1B:
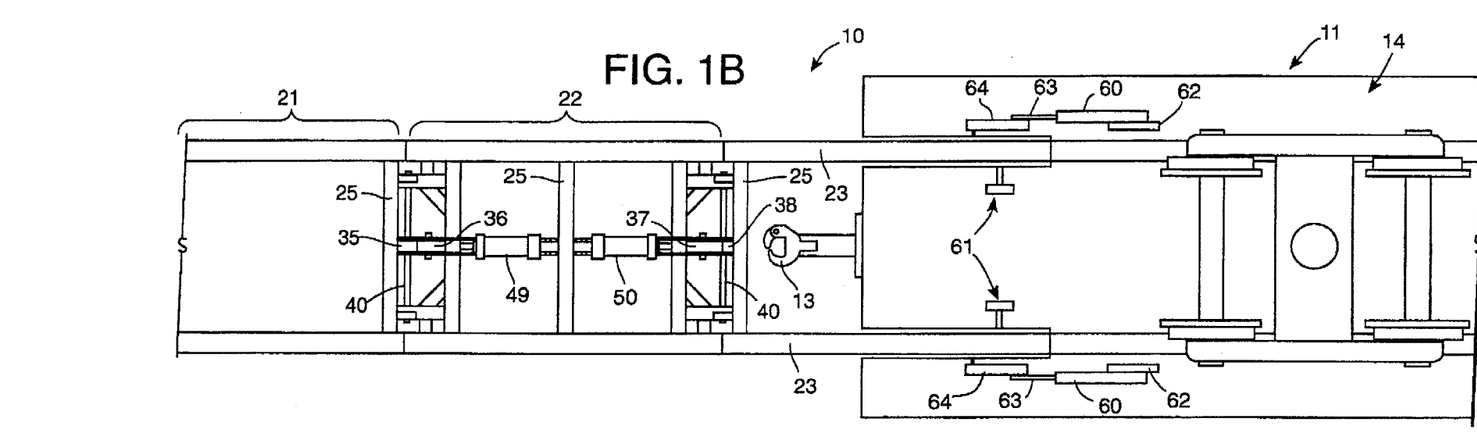
FIG. 1B is a right side view of FIG. 1.
Figure 6:
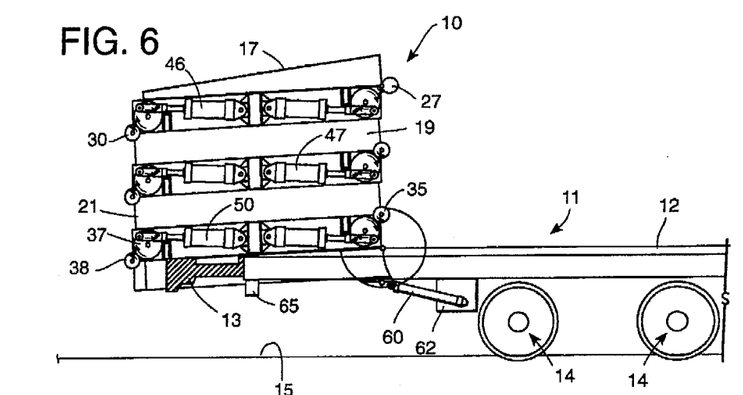
FIG. 6 is a view like that of FIG. 5 showing the folded ramp sections rotated 90° so that they are basically on, but overlap (horizontally) the railroad car supporting surface.
Figure 7:
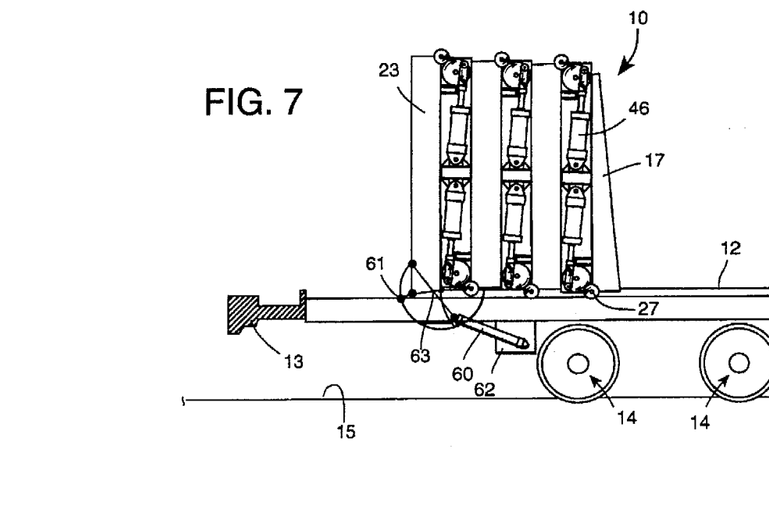
FIG. 7 is a view like that of FIG. 6 showing the folded ramp sections, and a lever to which they are attached, rotated 90° from the position of FIG. 6 to a transporting position.

As perhaps seen most clearly in FIGS. 1B, 2B, 6, and 7, the lever 23 is pivotally mounted at the first end thereof to the sixth ramp section 22, and pivotally mounted at a second end—as illustrated schematically at 61 in FIG. 1B—to the railroad car 11. In the embodiment illustrated in FIG. 1B two hydraulic cylinders 60 are provided, one mounted on each side of the railroad car 11 so that it is pivotally connected to a stationary component—such as the plate 62—fixed to the railroad car 11. The piston rod 63 of each of the cylinders 60 may be connected directly, or through an accessory lever 64, to the lever 23 at a position offset from the pivot point/axis 61. When the piston rod 63 is thus extended or retracted this pivots the lever 23 between a first generally horizontally extending position (in which it is typically stopped by a stop 65—seen only in FIG. 6) to a generally vertical position as seen in FIG. 7. A sequence of operation of the cylinder 60 is also controlled by the programmable controller 57 (see the schematic illustration of FIG. 8). The cylinder 60 is part of the same hydraulic system 55 as the other cylinders 45-50.

The basic apparatus according to the present invention having been described, a typical sequence of operation thereof, from the completely retracted transporting position of FIG. 7 to the completely deployed position of FIGS. 1 and 2, will now be described.

Upon actuation of the actuator 58 by an operator, the programmable controller 57 automatically controls the hydraulic system 55 and the larger cylinder(s) 60 so that the piston rod 63 is retracted and the completely Z-folded ramp assembly 10 is moved from the transporting position of FIG. 7 to the position of FIG. 6. In the position of FIG. 7 the ramp assembly 10 is substantially completely supported by the deck 12, while in the position illustrated in FIG. 6 it overlaps the deck 12 horizontally, extending horizontally outwardly therefrom.

Once the position illustrated in FIG. 6 is reached the programmable controller 57 automatically controls the cylinder 50 and the hydraulic system 55 so that the cylinder 50 rotates the gear 37 twenty-two and one-half degrees, which rotates the gear 38 ninety degrees, moving the ramp assembly 10 from the folded position of FIG. 6 to the position of FIG. 5 at which the deployment operation may be initialed.

From the position in FIG. 5 the controller 57 automatically operates the cylinders 45 and 49 to rotate the gears 36 and 48 a small amount, while the actuator 50 rotates gear 37 past the position illustrated in FIG. 5, until the sections 17, 22 have the configuration with respect of the sections 18 through 21 and the railroad car 11 illustrated in FIG. 4. At this point in time the removable wheels 24 have been connected by the operator to the first end of the first section 17, and the cylinders 45, 49, 50 have been actuated to the extent that the wheels 24 engage the train track rails 15 so that a significant part of the weight of the ramp assembly 10 is supported by the train track rails 15.

From the position illustrated in FIG. 4, the programmable controller 57 automatically controls the operation of all of the actuators 45-50 so that all of the ramp sections 17-22 are pivoted with respect to each other, and the lever 23. One of the intermediate positions during deployment where all of the ramp sections 18 through 21 separate from each other, and further from the ramp sections 17, 22, is illustrated in FIG. 3. When all of the cylinders 45-50 have been operated so that the piston rod/crank arms 52, 53 thereof have been fully extended, then the end edges of each of the ramp sections 17 through 22, and the end edges of the ramp section 22 and the lever 23, are in abutting engagement with each other, and the ramp sections 17 through 22 are then fully deployed. The wheels 24 may then be removed and the legs 70, 71, 72 (see FIGS. 2A and 2B) put in place. Alternatively, at least some of the legs (such as the legs 70, 71 as seen in FIG. 3) may automatically deploy, as described in U.S. Pat. No. 5,443,353. Also, if desired accessory latches or connections may be provided to connect the ramp sections 17-22 together in the fully deployed position of FIGS. 1 and 2.

The total time of operation from the transporting position of FIG. 7 to the fully deployed position of FIGS. 1 and 2 is less than about twenty minutes, typically between about 10-15 minutes. Retraction is accomplished in the exact reverse sequence as described above with respect to deployment, and also typically takes less than about twenty minutes, preferably about 10-15 minutes.

Utilizing the construction according to the present invention it is possible to make all of the components robust enough so that when used in with a railroad car 11 heavy railway equipment, e.g. up to about 60 tons, may move up a ramp assembly 10 to the deck 12, or off the deck 12 onto the train track rails 15.

It will thus be seen that according to the present invention in a deployable and retractable ramp assembly, for example in association with a railroad car, and a method of deploying and retraction thereof, have been provided having all of the advantages of the automatic ramp car described in U.S. Pat. No. 5,443,353, and also having the major components mounted directly on the ramp sections, and a greater reliability, and faster deployment and retraction times than in U.S. Pat. No. 5,443,353.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A deployable and retractable ramp assembly comprising:
   at least three Z-foldable ramp sections, each having a top surface for supporting objects movable over the ramp sections, and comprising first, second and third sections each having first and second ends, said second end of said first ramp section pivotally connected to said first end of said second ramp section, and said third ramp section first end pivotally connected to said second ramp section second end;
   first through fourth gears, said first gear mounted on said first ramp section second end and cooperating with said second gear mounted on said second ramp section first end, and said third gear mounted on said second ramp section second end and cooperating with said fourth gear mounted on said third ramp section first end;
   first and second actuators each mounted on one of said ramp sections and each connected to one of said gears for rotating said gear to effect pivotal action of said first ramp section with respect to said second ramp section, and said second ramp section with respect to said third ramp section;
   a railroad car;
   wherein said third ramp section is operatively pivotally connected at said second end thereof to said railroad car; and
   a pair of rail engaging wheels mounted to said first ramp section first end for engaging a train track rail and facilitating movement of said ramp sections with respect to a train track rail during deployment or retraction as said linear actuators are extended or withdrawn, respectively.

2. An assembly as recited in claim 1 wherein said actuators are linear actuators.

3. An assembly as recited in claim 2 wherein said linear actuators comprise hydraulic cylinders.

4. An assembly as recited in claim 2 wherein said first and second linear actuators are both mounted on said second ramp section, said first linear actuator connected to said second gear and said second linear actuator connected to said third gear.

5. An assembly as recited in claim 4 wherein each of said second and third gears have a gear ratio of at least about 2:1 with respect to said first and fourth gears.

6. An assembly as recited in claim 5 wherein each of said second and third gears have a gear ratio of about 4:1 with respect to said first and fourth gears.

7. An assembly as recited in claim 2 wherein said at least three ramp sections comprises at least four Z-folded ramp sections, including a fourth ramp section having first and second ends, said fourth ramp section pivotally connected at said first end thereof to said second end of said third ramp section; and further comprising fifth and sixth gears, said fifth gear mounted on said third ramp section second end and cooperating with said sixth gear, which is mounted on said fourth ramp section first end; and a third linear actuator connected to one of said fifth and sixth gears and mounted on one of said third and fourth ramp sections.

8. An assembly as recited in claim 7 further comprising a railroad car; and wherein said fourth ramp section second end is operatively pivotally connected to said railroad car for deployment or retraction with respect to said railroad car.

9. An assembly as recited in claim 8 wherein said at least four ramp sections comprise six substantially equal size Z-folded ramp sections, including fifth and sixth ramp sections having first and second ends, respectively, said fifth and sixth ramp sections operatively pivotally connecting said fourth ramp section to said railroad car.

10. An assembly as recited in claim 9 wherein said fifth ramp section first end is pivotally connected to said fourth ramp section second end, and said fifth ramp section second end is pivotally connected to said sixth ramp section first end, and said sixth ramp section second end is pivotally connected to said railroad car; and further comprising seventh, eighth, ninth, tenth, eleventh, and twelfth gears, said seventh gear connected to said fourth ramp section second end and cooperating with said eighth gear which is connected to said fifth ramp section first end, and said ninth gear connected to said fifth ramp section second end and cooperating with said tenth gear which is connected to said sixth ramp section first end, and said eleventh gear connected to said sixth ramp section second end and cooperating with said twelfth gear which is connected to said railroad car; and further comprising fourth, fifth and sixth linear actuators, said fourth actuator mounted to one of said fourth and fifth ramp sections and connected to one of said seventh or eight gears, and said fifth actuator mounted to one of said fifth and sixth ramp sections and connected to one of said ninth and tenth gears, and said sixth actuator mounted to one of said sixth ramp section and said railroad car and connected to one of said eleventh or twelfth gears; said fourth, fifth and sixth linear actuators cooperating with said first, second and third actuators to deploy or retract said ramp sections with respect to said railroad car.

11. An assembly as recited in claim 10 wherein said railroad car comprises a lever having first and second ends thereof, said lever first end comprising a portion of said railroad car pivotally connected, at said first end thereof, to said sixth ramp section and containing said twelfth gear, and said lever pivotally connected at said second end thereof to a non-pivotal portion of said railroad car; and further comprising a seventh linear actuator mounted to said railroad car and for moving said lever about said pivotal connection to said non-pivotal portion of said railroad car to move said ramp sections, when retracted, from a first position in which parts of said ramp sections extend horizontally outwardly from said railroad car, to a transporting position in which said ramp sections are all disposed substantially completely on said railroad car, and do not extend horizontally outwardly therefrom.

12. An assembly as recited in claim 1 further comprising means mounted on said railroad car for moving said ramp sections from a first retracted position in which a portion of each of said ramp sections extends horizontally outwardly from said railroad car, to a transporting retracted position in which said ramp sections are all disposed substantially completely on said railroad car, and do not extend horizontally outwardly therefrom.

13. An assembly as recited in claim 1 further comprising supporting legs for supporting said ramp sections when deployed from said railroad car.

14. A deployable and retractable ramp assembly mounted on a railroad car, comprising:

a railroad car having a substantially horizontal support surface;

at least three Z-foldable ramp sections, each having a top surface for supporting objects movable over the ramp sections, and comprising first, second and third sections each having first and second ends, said first end of said first ramp section having means operatively associated with a train track rail and said second end of said first ramp section pivotally connected to said first end of said second ramp section, and said third section first end pivotally connected to said second section second end and said third section second end operatively pivotally connected to said railroad car;

a plurality of actuators each mounted on and completely contained by at least one of said ramp sections; and a plurality of mechanical deployment and retraction facilitating elements mounted to said ramp sections and operatively connected to said actuators for cooperating with said actuators to effect pivotal action of said first ramp section with respect to said second ramp section, and said second ramp section with respect to said third ramp section, during deployment and retraction of said ramp sections with respect to said railroad car.

15. An assembly as recited in claim 14 wherein said mechanical deployment and retraction facilitating elements comprise gears, and wherein said actuators comprise linear actuators.

16. An assembly as recited in claim 14 wherein said at least three Z-foldable ramp sections comprise six substantially equal size Z-foldable ramp sections including fourth; fifth and sixth ramp sections which operatively pivotally connect said third ramp section to said railroad car, and are pivotally connected to each other.

17. An assembly as recited in claim 14 further comprising means mounted on said railroad car for moving said ramp sections when retracted from a first position in which parts of said ramp sections extend horizontally outwardly from said railroad car to a transporting position in which said ramp sections do not extend horizontally outwardly from said railroad car, but are substantially completely supported in a retracted position on said substantially horizontal support surface.

18. A method of deploying a plurality of ramp sections, each having a top surface for supporting objects movable over the ramp sections, and from a folded retracted position mounted on a substantially horizontal support surface of a railroad car, to a deployed position in which the ramp sections extend from the railroad car to a train track rail, allowing equipment to be moved on and off the railroad car along the ramp sections, said method comprising the steps of sequentially:

(a) automatically, using an actuator on the railroad car, moving the ramp sections from a first folded retracted position in which none of the ramp sections horizontally overlap the railroad car substantially horizontal support surface to a second folded retracted position in which the ramp sections horizontally overlap the railroad car substantially horizontal support surface;

(b) automatically moving the ramp sections from the second folded retracted position to a third folded retracted position in which the ramp sections are substantially completely horizontally exterior of the railroad car;

(c) automatically, using actuators substantially completely mounted on and contained by the ramp sections, causing one of the ramp sections to pivot with respect to the other ramp sections until a portion thereof engages the train track rail on which the railroad car is positioned, so that the rail-engaging portion partially supports the ramp sections; and (d) automatically, using actuators substantially completely mounted on and contained by the ramp sections, causing the ramp sections to pivot with respect to each other and the railroad car to move to the deployed position in which the ramp sections allow equipment to be moved on and off the railroad car over the top surfaces thereof to and from train track rails; and wherein steps (a)–(d) can be practiced in substantially reverse order to retract the ramp sections.

19. A deployable and retractable ramp assembly mounted on a railroad car, comprising:

a railroad car having a substantially horizontal support surface;

at least five foldable ramp sections, each having a top surface for supporting objects movable over the ramp sections, and comprising first, second, third, fourth and fifth sections each having first and second ends, said first and of said first ramp section having means operatively associated with a train track rail and said second end of each of said first, second, third and fourth sections pivotally connected to said first end of said second, third, fourth and fifth sections, respectively, and said fifth section second end operatively pivotally connected to said railroad car horizontal support surface;

a plurality of linear actuators mounted on and completely contained by at least two of said ramp sections, for pivotally moving each of said first through fifth sections with respect to each other to both deploy said sections from said car, and to retract said sections to move them onto said car; and supporting legs, opposite said top surfaces, for supporting said ramp sections when deployed from said railroad car.

20. An assembly as recited in claim 19 further comprising a sixth ramp section having first and second ends, said sixth ramp section first end pivotally connected to said fifth ramp section second end.

* * * * *